United States Patent [19]
Fröderberg

[11] Patent Number: 5,803,232
[45] Date of Patent: Sep. 8, 1998

[54] CONVEYOR BELT

[75] Inventor: Ingemar Fröderberg, Höganäs, Sweden

[73] Assignee: Frigoscandia Equipment AB, Helsingborg, Sweden

[21] Appl. No.: 706,696

[22] Filed: Sep. 6, 1996

[51] Int. Cl.[6] .................................................. B65G 21/18
[52] U.S. Cl. .......................................... 198/778; 198/848
[58] Field of Search ..................................... 198/778, 848

[56] References Cited

U.S. PATENT DOCUMENTS

| | | | |
|---|---|---|---|
| 2,904,165 | 9/1959 | Cook | 198/848 |
| 4,078,655 | 3/1978 | Roinestad | 198/778 X |
| 4,222,483 | 9/1980 | Wootton et al. | 198/848 X |
| 5,031,751 | 7/1991 | Pahlsson | 198/778 X |
| 5,423,416 | 6/1995 | Kucharski | 198/848 X |
| 5,501,319 | 3/1996 | Larson et al. | 198/778 |
| 5,590,755 | 1/1997 | Daringer et al. | 198/848 X |

*Primary Examiner*—James R. Bidwell
*Attorney, Agent, or Firm*—Browdy and Neimark

[57] ABSTRACT

A conveyor belt comprises a plurality of longitudinally spaced transverse rods. A plurality of side links at both lateral edges of the conveyor belt are connected in pairs by the successive transverse rods. Each side link is movable relative to adjoining side links about two axes perpendicular to the longitudinal direction of the conveyor belt. A wire netting is supported by the transverse rods and extends substantially over the whole width of the conveyor belt. The wire netting comprises a plurality of wires. A separate one of the wires forms a joint intermediate the lateral edges of the conveyor belt between each pair of adjoining transverse rods, each transverse rod in the pair connecting a separate pair of side links. Thereby, the joint takes up tractive forces at least along straight paths of the conveyor belt.

18 Claims, 5 Drawing Sheets

CONVEYOR BELT

BACKGROUND OF THE INVENTION

1. Field of the Invention

The present invention relates to a conveyor belt and more precisely to a conveyor belt comprising a plurality of longitudinally spaced transverse rods; a plurality of side links at both lateral edges of the conveyor belt connected in pairs by the successive transverse rods, each side link being movable relative to adjoining side links about two axes perpendicular to the longitudinal direction of the conveyor belt and situated one in the plane of the belt and the other perpendicular thereto; and a wire netting supported by the transverse rods and extending substantially over the whole width of the conveyor belt, said wire netting comprising a plurality of wires.

2. Background of the Prior Art

The above type of conveyor belt is advantageous for inter alia treating of food products by air in cooling, freezing or cooking the food products. It is often made to follow a helical path forming a stack of helically wound tiers. This is possible as a consequence of the fact that each side link is movable relative to adjoining side links about two axes perpendicular to the longitudinal direction of the conveyor belt and situated one in the plane of the belt and the other perpendicular thereto.

In order to make as full use as possible of the volume taken up by the stack, the inner radius of the helical path in the stack should be small. However, this requires a substantial collapsing of the corresponding inner side of the belt when transferring from a straight path to the helical path, thereby reducing the area of the belt in its straight state that can be used in the curved state of the conveyor belt, unless the outer side is expanded at the same time as the inner side is collapsed.

U.S. Pat. No. 4,078,655 to Roinestad discloses such a small radius belt having a plurality of rods extending across the belt and pivotally connected by links at the inner and outer edges of the belt. This belt also has a row of central tractive links controlling the simultaneous collapsing of the inner side of the belt and expanding of the outer side of the belt. However, these central links must be rigidly secured to the transverse rods, e.g. by welding, so as not to shift their position laterally. Also, they are raised above the wire netting or mesh of the belt such that the upper surface of the conveyor belt is not as smooth as desired.

SUMMARY OF THE INVENTION

An object of the present invention is to provide a conveyor belt which is capable of following tight horizontal curves while having a simple structure and a smooth surface.

This object is attained in that for each pair of adjoining transverse rods, each transverse rod in said par connecting a separate pair of side links, a separate one of said wires forms a joint intermediate the lateral edges of the conveyor belt between the adjoining transverse rods of said pair, such that the joint takes up tractive forces at least along straight parts of the conveyor belt path. Thus, the joints formed by wires of the same dimension as the wires forming the mesh, are used for taking up tractive forces at least along straight parts of the conveyor belt path. Thereby, the upper surface of the belt will be smooth.

If the joints are used for taking up tractive forces along straight parts of the path of the conveyor belt only, they can easily maintain their position under the influence of wires on either side thereof.

Preferably, the side links in each pair of side links are fixedly connected to each other by two adjoining transverse rods, making the conveyor belt more stable.

By increasing the width of each wire enclosing a pair of transverse rods joined by said separate wire from the joint to an outer edge of the conveyor belt in the helical path, the belt can collapse along the inner edge and expand along the outer edge when transferring from a straight path to a curved path.

DESCRIPTION OF THE PREFERRED EMBODIMENTS

Figure 1:
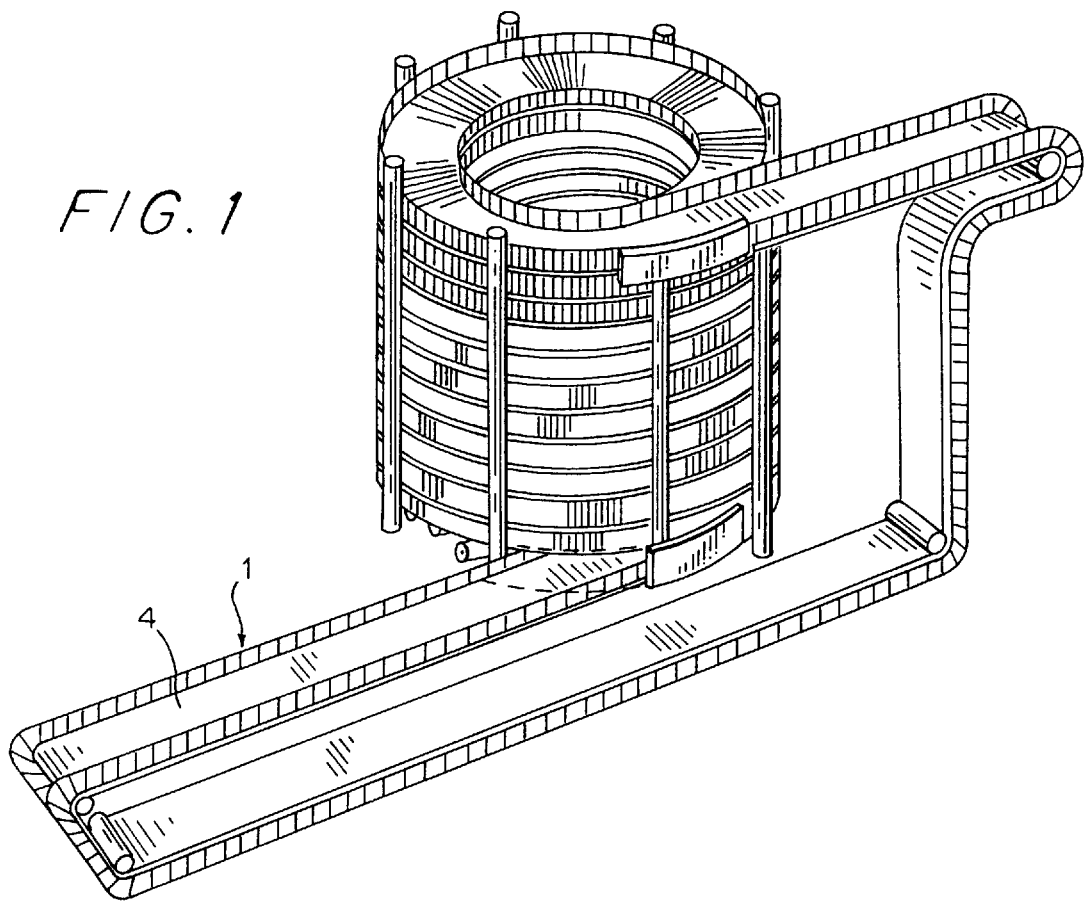
FIG. 1 is a perspective view of a belt conveyor in an air treatment plant for food, said belt conveyor utilizing a conveyor belt according to the present invention.

An endless conveyor belt 1 adapted for e.g. a conveyor of the type illustrated in FIG. 1, is arranged to travel, over part of its length, in a helical path in a number of superimposed turns or tiers. The conveyor belt 1 which is partially shown in FIGS. 2 and 3, comprises a number of hingedly interconnected and relatively adjustable units which consist of two transverse rods 2 and side plates 3 provided at the lateral sides of the bottom and forming the two sides of the conveyor belt 1. In the embodiment shown, these side plates also serve as links and as spacers, the upper edge portions of which engage the lower edge portions of the spacers of the overlying belt turn, to support this turn via its edge portions.

In the embodiment shown, the transverse rods 2 are fixedly connected in pairs with two side plates 3. The rods 2 are provided with a wire netting 4 serving as a supporting surface for the products to be air-treated and allowing a relative displacement of the units in the longitudinal direction of the belt at least along one edge of the conveyor belt, as well as relative turning of the units about two axes perpendicular to the longitudinal direction of the belt and located one in the plane of the botton and the other perpendicular thereto.

Figure 3:
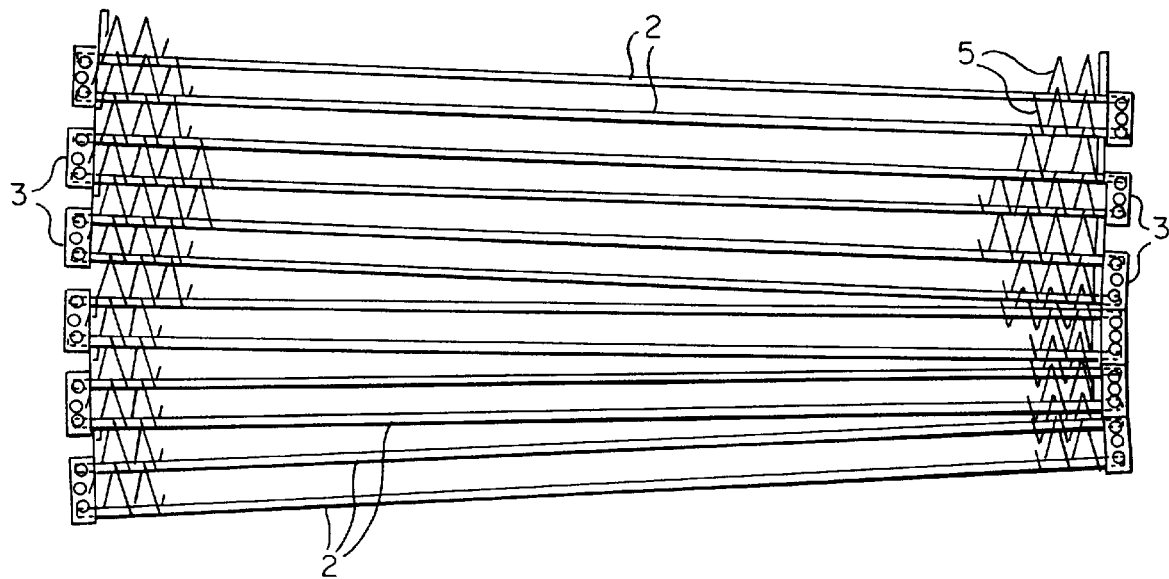
FIG. 3 is a top plan view of part of the conveyor belt in FIG. 2, including a wire netting.

In FIG. 3, the wire netting 4 consists of single wires 5 which have the form of a flattened helix and enclose the two rods 2 of one unit or one rod 2 of one unit and one rod 2 of an adjoining unit.

Figure 4:
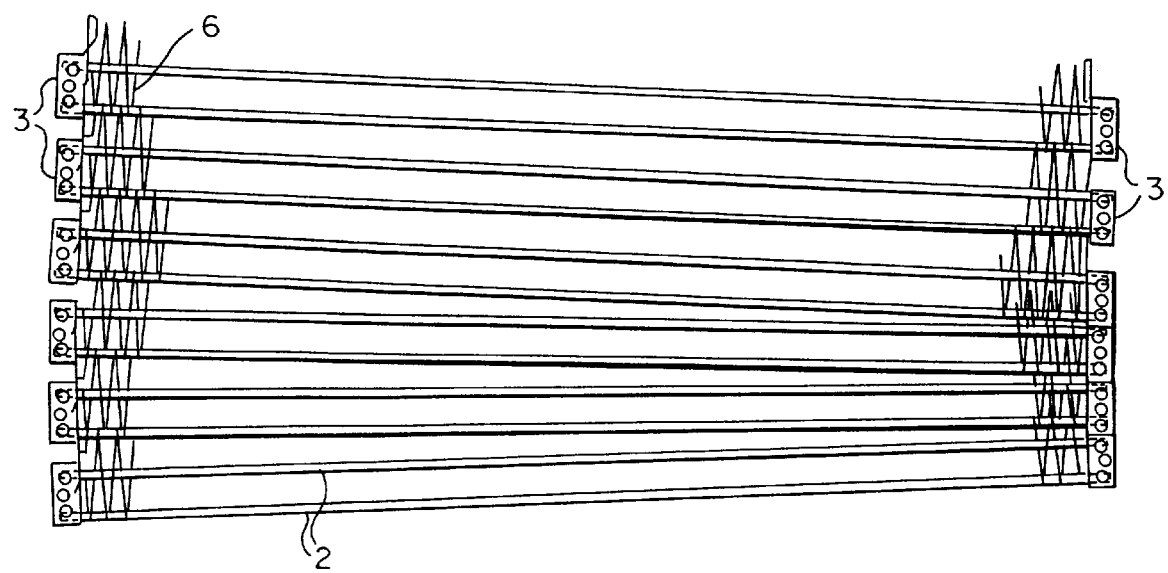
FIG. 4 shows the same conveyor belt as in FIG. 3 but with another type of netting.

In the embodiment shown in FIG. 4, each single wire 6 of the wire netting also has the form of a flattened helix but it encloses both the two rods 2 of one unit and an adjoining rod 2 of an adjoining unit.

The wire nettings of FIGS. 3 and 4 are described more in detail in U.S. Pat. No. 5,031,751 to Sten Påhlsson which is incorporated herein by reference.

Figure 5:
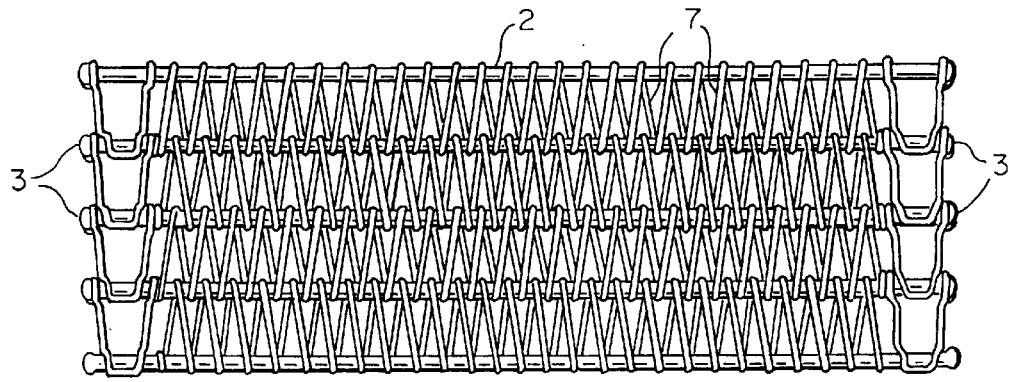
FIG. 5 is a top plan view of part of another embodiment of a conveyor belt, including a wire netting.

FIG. 5 shows an example of a conveyor belt in which each pair of side links 3 is fixedly connected by a single rod 2, the wire netting comprising a plurality of wires 7 each in the form of a flattened helix and enclosing two adjoining rods 2. Normally, this type of conveyor belt does not have side links forming spacers for overlying tiers but slides on helical rails. It should be noted that the conveyor belt illustrated in FIGS. 2–4 could also be of this type, i.e. having side links not forming spacers.

Figure 2:
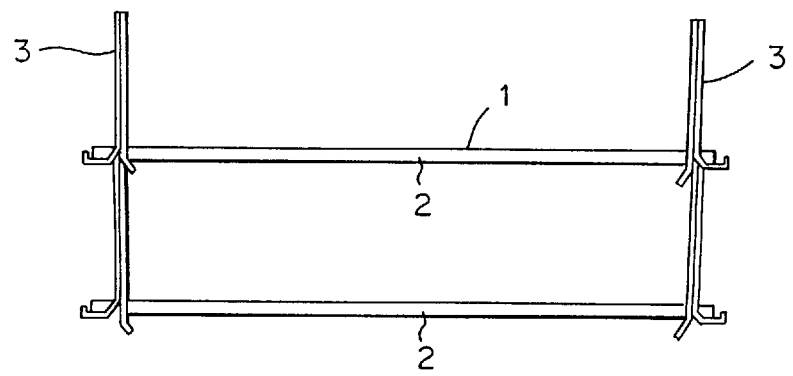
FIG. 2 is a schematic cross-sectional view of two link units in two belt turns or tiers.
Figure 6:
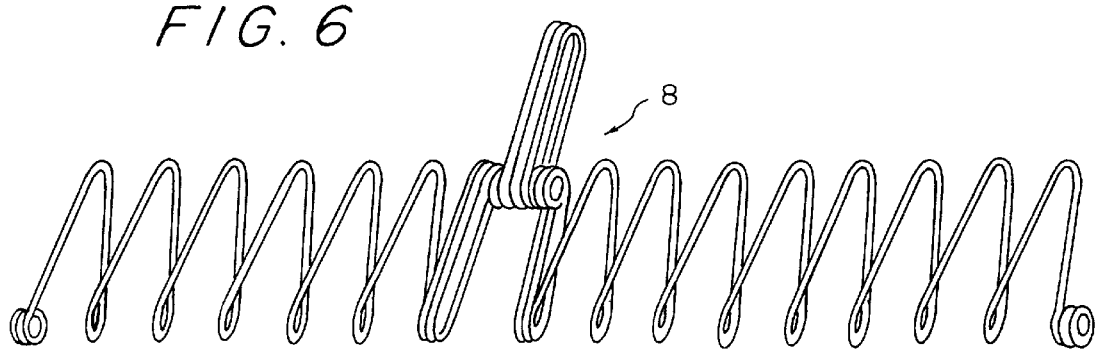
FIG. 6 is a perspective view of a single wire of a wire netting according to a first embodiment of the present invention.

FIG. 6 illustrates a single wire 8 of a wire netting according to the invention and adapted for use with a conveyor belt as illustrated in FIG. 2. The wire 8 is of the helical flattened type having several turns of a constant width in the longitudinal direction of the conveyor belt and having a first pitch along the length of the enclosed rods (not shown) except for at a mid portion where several turns of the wire is extended beyond the width of the remainder of the wire helix for enclosing an adjoining rod in the conveyor belt and forming a joint intermediate the lateral edges of the conveyor belt between each pair of adjoining transverse rods, each transverse rod in said pair connecting a separate pair of side links. Thereby, the joint can take up tractive forces at least along, but preferably only along straight parts of the conveyor belt path.

These extended turns have a much smaller pitch than said first pitch, preferably a pitch substantially corresponding to the diameter of the wire itself. Also, the wire 8 is wound several turns directly around the central rod enclosed by the wire 8, such that the position of the wire 8 is fixed along the length of the conveyor belt.

Figure 7:
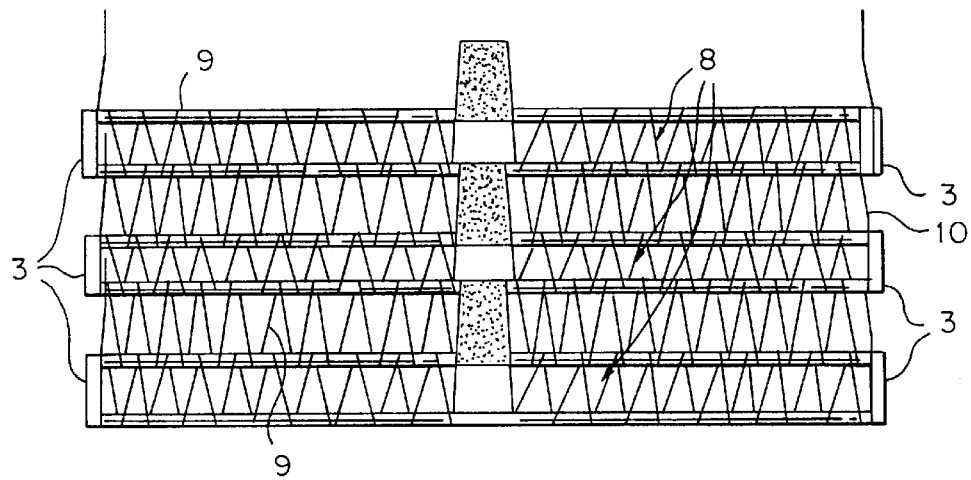
FIG. 7 is a schematic top plan view showing the aggregate of several wires according to FIG. 6.

To complete the wire netting using several wires 8, first and second shorter wires 9 and 10, respectively, may be used, as illustrated in FIG. 7, where the joint is shown as black quadrangle.

The wires 9 have the same first pitch as the wire 8 and a greater width than the width of said extended turns of the wire 8 such that the wires 9 do not at any time take up any tractive forces on the belt.

The wires 10 could be identical to the wires 9. However, in that case the side links on the outer side of a curved path cannot expand at all. Therefore, the wires 10 preferably have a width which increases from the joint to the side link at one lateral edge of the conveyor belt such that the conveyor belt can expand at its laterally outer side and collapse at its laterally inner side along a curved part of its path.

Figure 8:
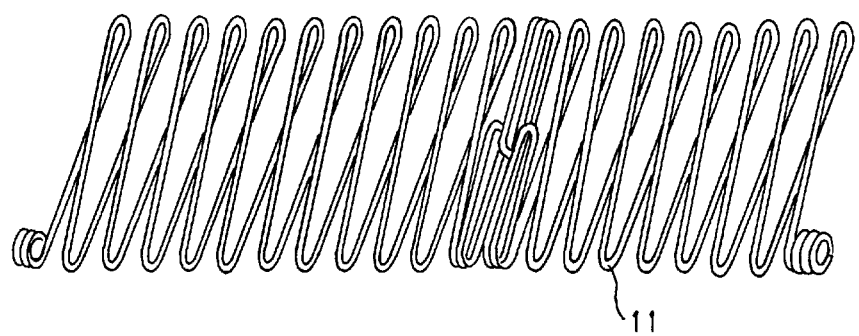
FIG. 8 is a perspective view of a single wire of a netting according to a second embodiment of the present invention.

In FIG. 8, a second embodiment of a single wire 11 of a netting for a conveyor belt of the the type shown in FIGS. 3 and 4 is illustrated. This wire 11 is also of the flattened helix type having a substantially constant width in the longitudinal direction of the conveyor belt corresponding to the distance between every second rod (not shown) of the conveyor belt. However, said constant width is larger than the width of the wire 11 at the mid portion thereof such that only this mid portion can take up tractive forces excerted on the conveyor belt in the longitudinal direction thereof. It should be noted that the wire 11 has the same form as the wire 8 at its mid portion and therefore has a fixed position in relation to the middle rod enclosed thereby.

Figure 9:
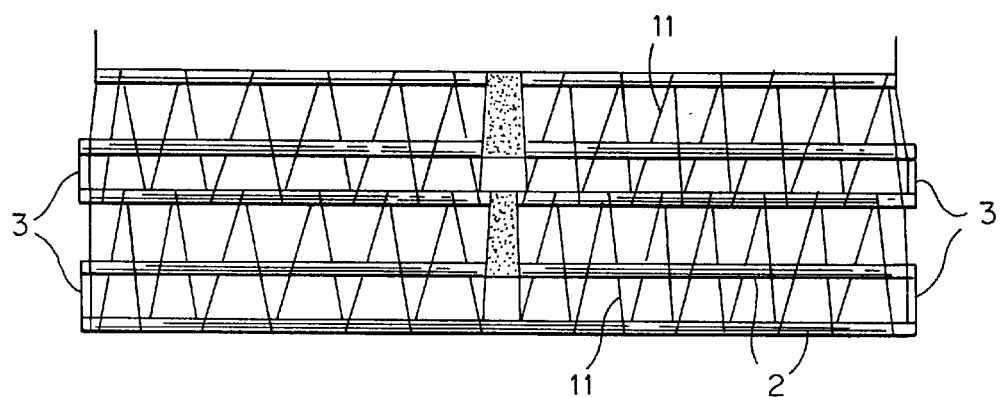
FIG. 9 is a schematic top plan view showing the aggregate of several wires according to FIG. 8.

FIG. 9 illustrates a wire netting consisting of several wires 11 and shows the joints as black quadrangles. It should be noted that in this case the wire netting consists of one single type of wire, i.e. the wire 11. However, on one side of the mid portion the width of the wire 11 preferably increases towards the side link 3 so as to allow expanding of the conveyor belt on that side of the mid portion while the belt on the other side of the mid portion collapses.

Figure 10:
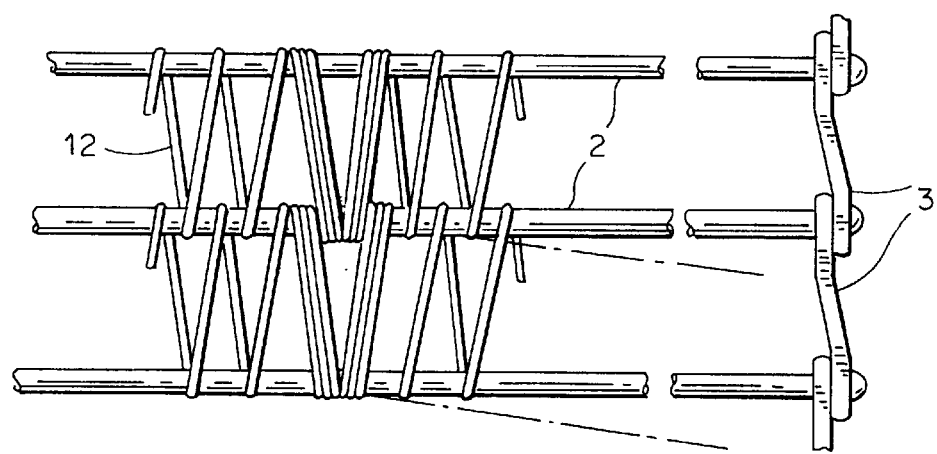
FIG. 10 is a top plan view of two wires according to a third embodiment of the present invention.

FIG. 10 illustrates a third embodiment of the present invention adapted to the type of conveyor belt illustrated in FIG. 5. Also in this case, a single type of helical, flattened wire 12 is used to form the netting. The wire 12 has a substantially constant width over its length which however is greater than the width of the wire in a mid portion thereof. The mid portion comprises a plurality of turns within the width of the remainder of the wire having a much smaller pitch than said remainder, preferably a pitch corresponding to the diameter of the wire itself.

FIG. 11 A–E illustrates the various embodiments of the present invention when each pair of side links is fixedly connected to each other by two transverse rods and these rods are enclosed by the separate wire substantially along their whole length. However, neither the side links nor the transverse rods are shown in FIG. 11, where the joints are shown as black quadrangles.

FIG. 11 A illustrates the embodiment shown in FIGS. 6 and 7, including the separate wire 8 and the first and second shorter wires 9 and 10, respectively.

Figure 11A:
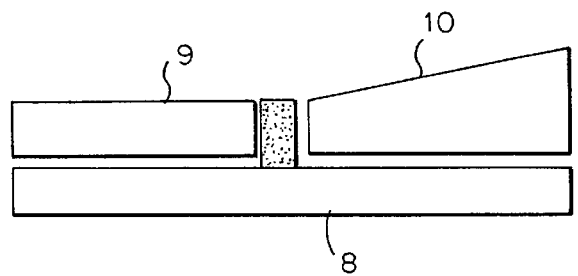
FIG. 11 illustrates several embodiments of the present invention in outline.
Figure 11B:
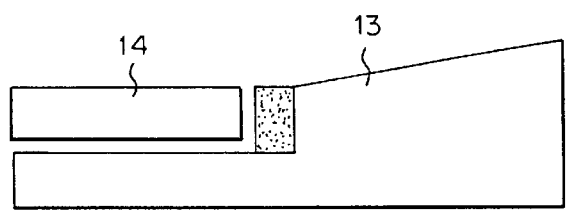

In FIG. 11B, a separate wire 13 also encloses the two adjoining rods from the joint to one of the lateral edges of the conveyor belt. The width of the flattened helix of the separate wire 13 in the longitudinal direction of the conveyor belt is greater therebetween than the length of the joint in the same direction in that the width of the flattened helix of the separate wire 13 increases from the joint to said one lateral edge of the conveyor belt. A further wire 14 in the form of a flattened helix encloses the two adjoining transverse rods between the joint and the other of the lateral edges of the conveyor belt.

Figure 11C:
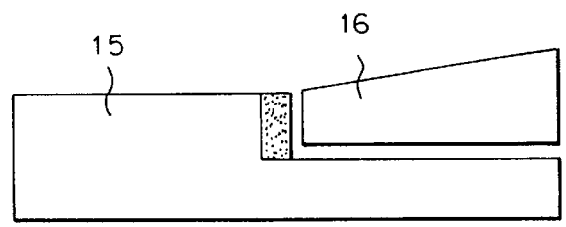

The embodiment shown in FIG. 11C corresponds substantially to the embodiment of FIG. 11B and has a separate wire 15 and a further wire 16. However, here the width of the further wire 16 increases from the joint to one lateral edge of the conveyor belt.

Figure 11D:
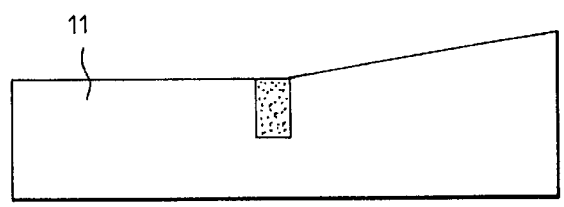
Figure 11E:
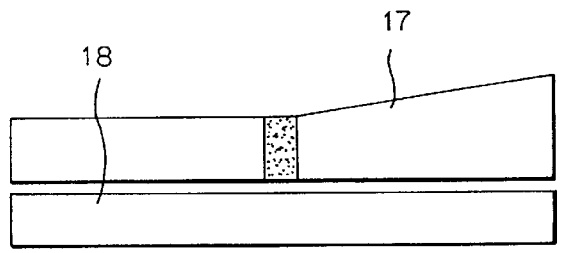

FIG. 11D represents the embodiment illustrated in FIGS. 8 and 9.

The embodiment shown in FIG. 11 E uses a separate wire 17 which encloses only the two adjoining transverse rods which connect a separate pair of side links. Another wire 18 encloses only the two transverse rods that connect one and the same pair of said links.

It is preferred that only the side links at an outer side of the conveyor belt are tractive along a curved part of the conveyor belt path, since the wires of the wire netting then are not affected by any lateral forces that otherwise could displace the wires laterally along the rods. Along straight parts of the conveyor belt path the tractive forces should be taken up by the joints at the mid portions of the wires forming said joints and also by the side links on one lateral side of the conveyor belt.

A variety of modifications of the conveyor belt described above are possible within the scope of the invention as defined in the appended claims.

What is claimed is:

1. A conveyor belt comprising
   a plurality of longitudinally spaced transverse rods,
   a plurality of side links at both lateral edges of the conveyor belt connected in pairs by the successive transverse rods, each side link being movable relative to adjoining side links about two axes perpendicular to the longitudinal direction of the conveyor belt and situated one in the plane of the belt and the other perpendicular thereto, and a wire netting supported by the transverse rods and extending substantially over the whole width of the conveyor belt, said wire netting comprising a plurality of wires, wherein a separate one of said wires forms a joint intermediate the lateral edges of the conveyor belt between each pair of adjoining transverse rods, each transverse rod in said pair connecting a separate pair of side links, such that the joint takes up tractive forces at least along straight parts of the conveyor belt path.

2. A conveyor belt as claimed in claim 1, wherein each pair of aside links is fixedly connected to each other by two transverse rods and wherein said separate wire has the form of a flattened helix and encloses these two transverse rods substantially along the whole length thereof.

3. A conveyor belt as claimed in claim 2, wherein said separate wire encloses the two adjoining transverse rods joined thereby from the joint to one of the lateral edges of the conveyor belt, the width of the flattened helix of said separate wire in the longitudinal direction of the conveyor belt being greater therebetween than the length of said joint in the longitudinal direction of the conveyor belt.

4. A conveyor belt as claimed in claim 3, wherein the width of the flattened helix of said separate wire increases from said joint to said one of the lateral edges of the conveyor belt.

5. A conveyor belt as claimed in claim 3, wherein a further wire in the form of a flattened helix encloses said two adjoining transverse rods between said joint and the other of the lateral edges of the conveyor belt.

6. A conveyor belt as claimed in claim 5, wherein the width of the helix of said further wire in the longitudinal direction of the conveyor belt increases from the joint to said other of the lateral edges of the conveyor belt.

7. A conveyor as claimed in claim 2, wherein said separate wire encloses said adjoining transverse rods only at said joint, and wherein a second and a third separate wire encloses said adjoining transverse rods on either side of the joint.

8. A conveyor as claimed in claim 7, wherein the second and third wires have the form of a flattened helix having a greater width than the length of said joint in the longitudinal direction of the conveyor belt.

9. A conveyor belt as claimed in claim 8, wherein said width of the flattened helix of one of said second and third wires increases from the joint to one of the lateral edges of the conveyor belt.

10. A conveyor belt as claimed in claim 1, wherein said separate wire encloses said pair of adjoining transverse rods substantially along the whole length thereof in the form of a flattened helix having a greater width than the length of said joint in the longitudinal direction of the conveyor belt.

11. A conveyor belt as claimed in claim 10, wherein the width of the flattened helix increases from the joint to one of the lateral edges of the conveyor belt.

12. A conveyor belt as claimed in claim 11, wherein each pair of side links is fixedly connected to each other by two transverse rods, said separate wire enclosing both said transverse rods substantially along the whole length thereof.

13. A conveyor belt as claimed in claim 11, wherein each pair of side links is fixedly connected to each other by two transverse rods and wherein a further wire encloses these two transverse rods substantially along the whole length thereof.

14. A conveyor belt as claimed in claim 1, wherein the conveyor belt follows a helical path forming a stack of helically wound tiers and wherein the side links on at least one side of the conveyor belt extend above the netting of the belt for supporting a corresponding part of the belt in the stack formed by helically wound tiers of the belt.

15. A conveyor belt as claimed in claim 1, wherein only the side links at an outer side of the conveyor belt are tractive along a curved part of the conveyor belt path.

16. A conveyor belt as claimed in claim 1, wherein only the side links at an inner side of the conveyor belt and the joints are tractive along a straight part of the conveyor belt path.

17. A conveyor belt as claimed in claim 1, wherein the joint comprises several turns of the wire having a pitch substantially equal to the diameter of the wire.

18. A conveyor belt as claimed in claim 17, wherein each joint comprises at least one turn of wire around at least one of the two transverse rods joined by the same wire, said turn having a pitch substantially equal to the diameter of the wire.

* * * * *